C. L. GARDNER.
GRAIN BAGGER.
APPLICATION FILED JAN. 7, 1910.
1,011,048.
Patented Dec. 5, 1911.
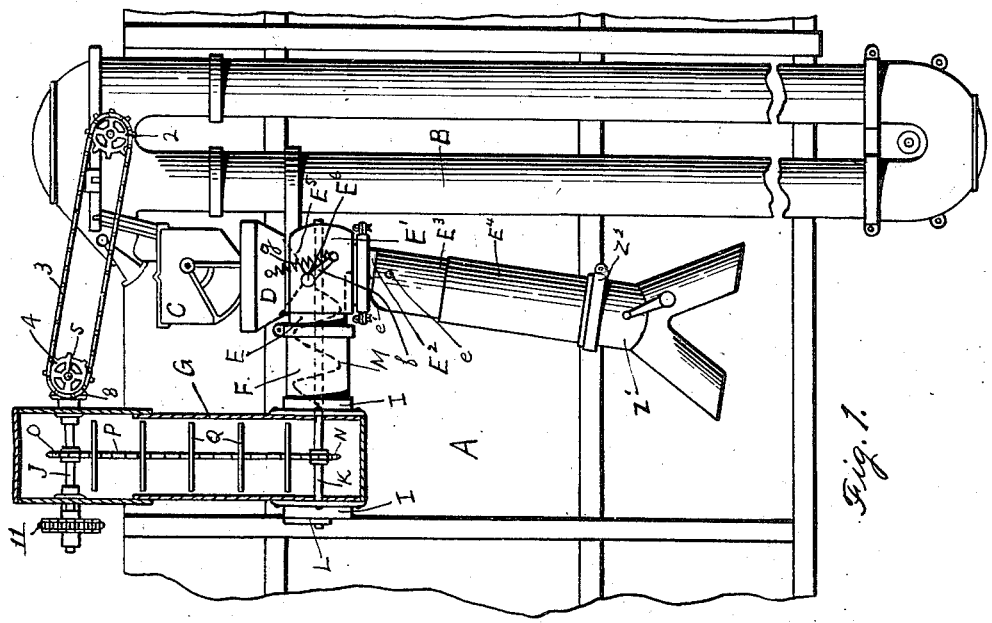
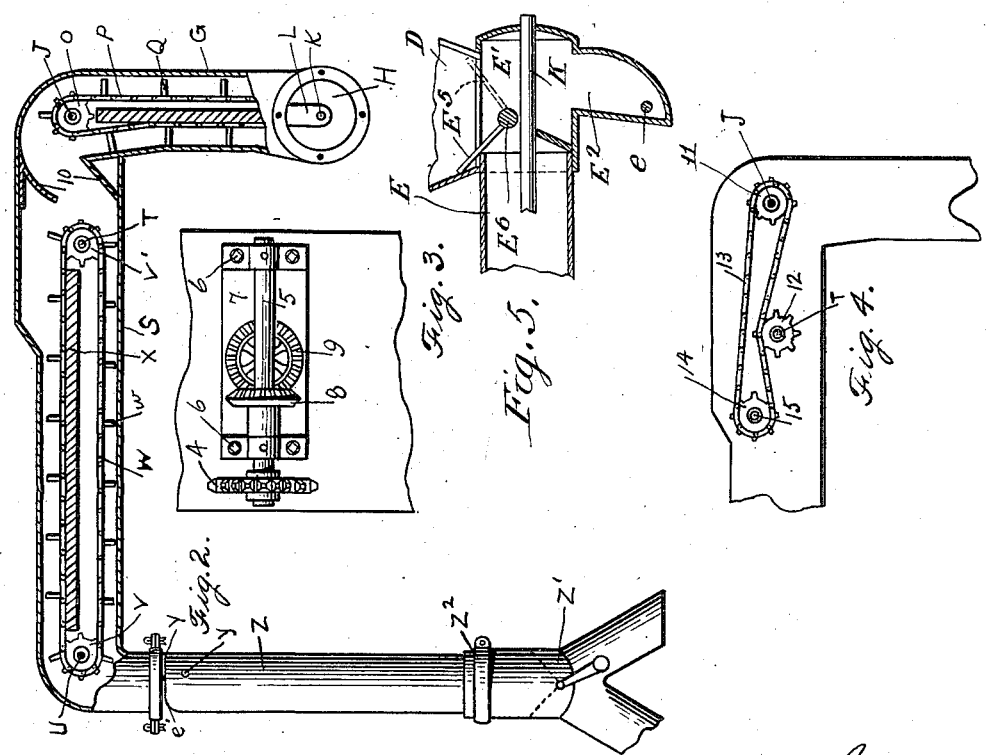

UNITED STATES PATENT OFFICE.

CHARLES L. GARDNER, OF PEORIA, ILLINOIS, ASSIGNOR TO GARDNER GRAIN WEIGHER CO., OF OTTAWA, ILLINOIS, A CORPORATION OF ILLINOIS.

GRAIN-BAGGER.

1,011,048.  Specification of Letters Patent.  Patented Dec. 5, 1911.

Application filed January 7, 1910. Serial No. 536,893.

*To all whom it may concern:*

Be it known that I, CHARLES L. GARDNER, a citizen of the United States, residing at Peoria, in the county of Peoria and State of Illinois, have invented certain new and useful Improvements in Grain-Baggers, of which the following is a specification.

My invention relates to new and useful improvements in grain baggers adapted to be used in connection with grain threshing machines or in connection with grain threshing and grain weighing machines, and relates generally to the same subject matter as is contained in applicant's copending application filed October 1, 1909, Serial No. 520,598.

My invention relates particularly to structures and adaptations of the same to facilitate the maintenance of structures low down upon the deck of the threshing machine so as to obviate the removal of such structures in passing through doorways of barns and the like.

Referring to the drawings, Figure 1 is a side elevation partially in section, showing the general application of the device for use; Fig. 2 is a side elevation partially in section showing elevating, cross conveying and spout portions; Fig. 3 is a detail view showing certain driving connections; Fig. 4 likewise shows in detail the application of certain driving mechanism; and, Fig. 5 is a detail view of the receiving end of a conveyer section.

A refers to the side of the threshing machine body, B to an elevator commonly used on threshing machines, C to a grain weigher commonly used and D to a hopper which is mounted upon a tubular conveying portion comprising the sections E and F.

G is a vertically disposed elevator section provided at its lower portion with openings as H shown in Fig. 2, one on either side, in line with the tubular conveyer portion comprising parts E and F.

I are cast plates provided with open center adapted to receive the end of section F of the conveyer tube.

J is a shaft journaled in the upper portion of the elevator section G.

K is a shaft supported in the forward end of the conveyer portion E' by providing suitable boxing support in the wall of said portion, the other end of said shaft being supported in a perforation in a depending lug L as best shown in Fig. 2. Upon said shaft K is carried an ordinary auger shown in dotted lines at M in Fig. 1.

N is a sprocket wheel carried upon shaft K, and O is a sprocket wheel carried upon shaft J.

P is a sprocket chain connecting wheels N and O upon which are carried the flights as Q.

S is a cross conveyer section adapted to be carried over the top of the separator and shafts T and U are supported within said section carrying sprocket wheels V and V' connected by sprocket chain W carrying flights as $w$. X is a horizontally disposed partition in said cross conveyer section S extending a portion of the length of said section. The rear end of section S is turned downwardly and has an ordinary swivel connection with a throat part Y and Z is a spout pivoted to throat part Y upon studs $y$. On the opposite side of the machine from that upon which spout Z is placed, the conveyer section E' has a swivel connection with the throat part $E^2$.

$E^3$ and $E^4$ form a spout having a pivotal connection with throat $E^2$ upon studs as $e$. One edge of spout Z and also the spout formed of sections $E^3$ and $E^4$ are cut away as at $e'$ in such a manner as to provide clearance for the swinging of said spouts. Upon the lower end of section $E^4$ and likewise on the lower end of spout Z there is provided the furcated chute Z' having an ordinary swivel connection as at $Z^2$ and provided with a valve therein purposed to direct the flow of grain alternately from one branch to the other of the furcated spouts.

In the conveyer section E', a valve $E^5$ is provided supported upon the valve shaft $E^6$ which is properly journaled in the walls of conveyer section E', the said valve shaft being provided with the arm $f$ with the outer end of which the spring $g$ connects, said spring likewise being connected with the hopper, the said spring serving to hold the valve $E^5$ in a fixed and determined position after the same has been adjusted, application of such valves being common to cross conveyers. An opening is provided in the lower portion of section E' of the conveyer, as is common to conveyers, communicating with the spout formed of sections $E^3$ and E⁴ and the partition E⁷, shown in dotted lines, is provided to properly deflect grain into the conveyer tube comprising sections E and F.

The movable conveying parts of the bagger are adapted to be driven from the continuously operated sprocket wheel 2 carried in the upper end of the elevator B, which communicates its movement through sprocket chain 3 to the sprocket wheel 4 which said sprocket wheel is supported upon the shaft 5 (see Fig. 3) which is journaled in boxings 6 formed upon plate 7 which is attached to the side of the elevator section G.

8 is a bevel gear fixed to shaft 5 and 9 is a bevel gear wheel fixed to shaft J in the upper end of elevator section G. The movement of shaft 5 is conveyed through gear wheels 8 and 9 to shaft J to cause the elevator parts within elevator section G to be moved and likewise will cause the auger M within the conveyer section comprising parts E′ and F to be turned to cause grain deflected into said conveyer to be conveyed to the boot of the elevator and from thence upwardly to be deposited into cross conveyer section S. 10 are deflectors supported within the walls of section S adapted to properly direct the grain to the lower portion of said conveyer section S.

The conveyer mechanism within cross conveyer section S is driven from shaft J through and by means of the sprocket wheel 11 being fixed thereon, which imparts its motion to a sprocket wheel 12 fixed upon shaft T, through sprocket chain 13 which is carried over an idler wheel 14 on a stud shaft 15 and caused to bear over said sprocket wheel 12, the particular arrangement of such connection being for the purpose of reversing the direction of movement of the conveyer in cross conveyer section S from that obtaining in vertical section G.

The conductor spout comprising sections E³ and E⁴ may be made to telescope in a manner such as shown in the drawing, for the purpose of extending or lengthening the spout as desired, and the parts may be made in size and so related that the frictional relation of the walls may serve to hold them in any position of adjustment in which they may be placed.

A circular opening is provided as at H in the boot of elevator section G and provided with surrounding cast plates I for the purpose of providing interchangeably the location of the principal elevating and the weighing mechanism upon either side of the machine and to render the elevating and cross conveying portions of the bagger device adaptable to such change of position. When the elevator B is changed to the opposite side of the machine, the sections G and S of the elevator are likewise reversed and the connection of section F of the auger conveyer spout is made with the opening on the opposite side of that shown in Fig. 1, and a suitable closure plate (not shown) is provided to close the opening H adapted to fit the opening which is the same on both sides.

What I claim is:

1. The combination with a threshing machine, of a cross conveyer thereon comprising a section extending from side to side of the thresher and a section communicating therewith depending downwardly upon one side of the thresher, a horizontally disposed conveyer at the side of the thresher arranged to discharge into the depending portion of the cross conveyer, a discharge outlet from the latter conveyer at its inlet end, and a valve for controlling said outlet.

2. The combination with a threshing machine, of a cross conveyer thereon comprising a portion extending from side to side of the thresher and another portion communicating therewith and adapted to deliver grain thereto extending downwardly at one side of the thresher, said cross conveyer being provided in the cross portion adjacent its connection with the downwardly extending portion with a deflector adapted to direct the flow of grain from the latter section into the former, a horizontally disposed conveyer arranged to discharge into the cross conveyer and a valve controlled discharge outlet from said latter conveyer at the inlet end thereof.

3. The combination with a threshing machine, of a cross conveyer extending from side to side thereof, a vertically disposed conveyer at the side of the thresher arranged to discharge into the cross conveyer, a horizontally disposed conveyer at the side of the thresher arranged to discharge into the vertically disposed conveyer, and a valve controlled outlet at the receiving end of the horizontal conveyer.

4. The combination with a threshing machine, of a cross conveyer thereon extending from side to side thereof, a vertically disposed conveyer at the side of the thresher arranged to discharge into the cross conveyer, a horizontally disposed tubular member at the side of the thresher communicating with the vertically disposed conveyer, provided with a hopper at its receiving end, and a valve controlled discharge opening at its receiving end, and an auger operative in said tubular member between the discharge opening at its inlet end and the discharge opening at its outlet end.

5. The combination with a threshing machine, of a cross conveyer section extending across the top of the machine, a vertically disposed section communicating with the former section extending downwardly at one side of the machine, a horizontally disposed conveyer section at the side of the machine arranged to discharge into the vertically disposed section provided with a valve controlled discharge opening at its inlet end and a conveyer in the horizontally disposed section at the side of the thresher operative between the discharge openings at the inlet and outlet ends of the latter section.

6. In a cross conveyer for threshing machines, in combination, a cross conveyer section extending across the top of the thresher, provided with a discharge opening at its outlet end and with grain directing or deflector means at its receiving end, a vertically disposed section at the side of the machine discharging into the former section, a horizontally disposed section at the side of the machine in a plane below the cross conveyer section, discharging into the vertically disposed section, provided with a hopper and a discharge outlet at the receiving end thereof, and a valve for directing the flow as desired, either to the discharge opening in the receiving end or through the conveyer section, and a conveyer operative in said section between the discharge opening at the receiving end, and the discharge opening at its outlet end.

7. In a device of the class described, in combination, a conveyer section extending from side to side of a threshing machine, a vertically disposed conveyer section at the side of the machine communicating with the former section, a horizontally disposed conveyer section at the side of the machine in a plane below the conveyer section which extends across the machine, communicating with the vertically disposed section and provided with a hopper and a discharge outlet at the receiving end thereof, and a valve for directing the flow as desired, either to the discharge opening in the receiving end, or through the conveyer section, and a conveyer operative in said section between the discharge opening at its receiving end and the discharge opening at its outlet end.

In testimony whereof I have affixed my signature in presence of two witnesses.

CHARLES L. GARDNER.

Witnesses:
MARY E. COMEGYS,
W. W. TEFFT.

---

Copies of this patent may be obtained for five cents each, by addressing the "Commissioner of Patents, Washington, D. C."